April 22, 1952   J. M. MARTINEZ   2,594,047
CATHODE
Filed March 22, 1946   2 SHEETS—SHEET 1
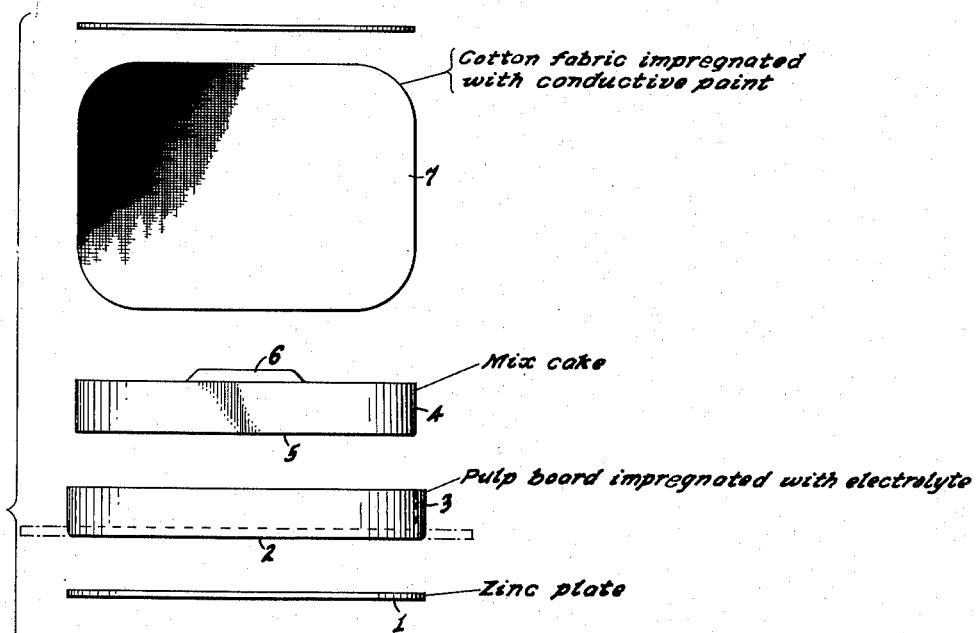
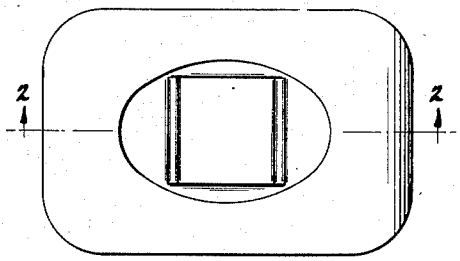
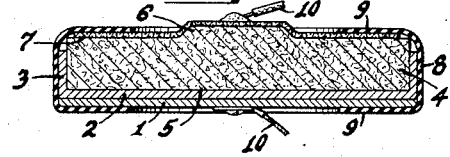
INVENTOR
John M. Martinez
BY
Pennie, Edmonds, Morton & Barrows
ATTORNEY April 22, 1952 J. M. MARTINEZ 2,594,047
CATHODE
Filed March 22, 1946 2 SHEETS—SHEET 2
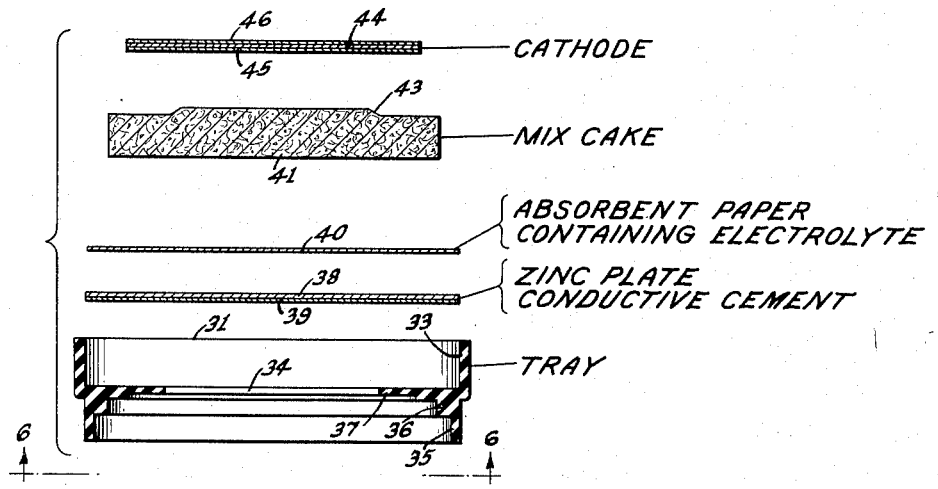
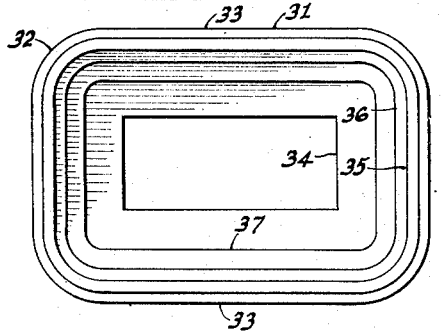
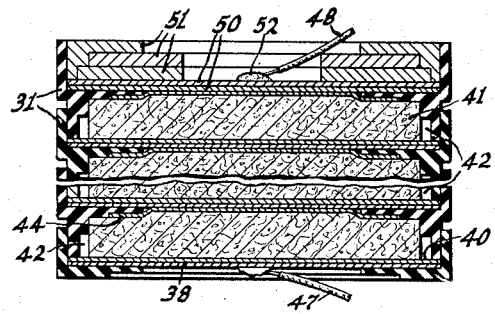
INVENTOR.
John M. Martinez

UNITED STATES PATENT OFFICE 2,594,047

CATHODE

John M. Martinez, New Haven, Conn., assignor to Olin Industries, Inc., New Haven, Conn., a corporation of Delaware Application March 22, 1946, Serial No. 656,203

8 Claims. (Cl. 136—111)

This invention relates to dry cells and more particularly to an improved cathode for use in dry cells of the "flat type."

For various purposes the flat type battery is now being extensively used. Such batteries consist of a plurality of cells formed of flat elements and are extremely useful where a plurality of cells are connected in series. In such construction the anode of one cell and the cathode of the adjacent cell can be brought into direct contact with each other thereby eliminating the necessity of connections between the cells of a battery.

It has been proposed to assemble the elements of a cell in a tray or container having an open top and having an opening of appreciable size in the bottom to expose a portion of the anode. A plurality of such assemblies are then superimposed on each other to produce a battery.

It has also been proposed to retain the elements of each cell or group in assembled arrangement by means of an elastic covering extending over the side walls of the cell and extending slightly over the upper and lower surfaces at the edges, thus exposing the electrodes through the remainder of the upper and lower faces.

In either of these instances it is necessary to offset a portion of the cathode or the anode of each cell to insure good contact between the cathode of one cell and the anode of the adjacent cell.

While the cathode forming the subject matter of the present invention may be employed in various types of cell constructions it is particularly adapted for use in cells of the flat type intended to be stacked to form a battery of a number of cells. The flexibility of the cathode permits the use of flat zinc plates as anodes and, at the same time, insures the necessary intimate contact between the cathode of one cell and the anode of the adjacent cell by shaping the mix cake and offsetting the cathode enough to cause it to project through the opening in the tray or wrapper into contact with the anode of the adjacent cell.

In the accompanying drawings I have shown several forms of the invention and have also illustrated one cell construction employing the cathode of the present invention. In this showing:

Fig. 1 is a plan view of a cell employing the cathode of the present invention;

Fig. 2 is a vertical, central view on line 2—2 of Fig. 1;

Fig. 3 is an exploded view showing the elements of the cell in side elevation and also showing a plan view of the cathode;

Fig. 4 is a sectional view of the elements of a cell, separated for clarity of presentation, employing the flexible cathode of the present invention in a cell mounted in a rigid tray;

Fig. 5 is a vertical, sectional view of a battery made of a plurality of cells of Fig. 4; and Fig. 6 is a plan view of one of the trays.

Referring to Figs. 1 to 3 of the drawings, the reference numeral 1 designates the anode of the cell which is preferably a flat sheet of zinc of the desired shape. If the cell is to be employed as one of a plurality of cells forming a battery with the individual cells connected to others in series, the lower face of the anode may be covered with a coating of conductive cement as described in copending application Serial No. 656,205, filed March 22, 1946, now U. S. Patent No. 2,526,789. This coating may consist of a mixture of a conductive pigment, such as graphite or acetylene black or a mixture of the two, dispersed in a suitable solvent, such as a mixture of methyl ketone and toluene, and containing a thermoplastic cement admixed therewith.

On the other side of the anode I provide a separator 2 as in the usual cell construction and this separator may be provided with a coating of paste on the side adjacent the anode and carry the usual electrolyte. In constructing the cell disclosed herein in which none of the other cell elements or the container are rigid, I preferably employ a separator formed of pulp board impregnated with electrolyte which is originally shaped as shown in Fig. 3 but in which the outer edges are turned upwardly from the dotted line position to form a flange 3 which will surround a portion of the mix cake and form a container therefor.

A mix cake 4 is arranged on top of the separator, the mix cake consisting of a pressed cake of the usual depolarizing mix used in dry cells. It may thus consist of a mixture of powdered carbon and manganese dioxide in cake form. The mix cake is of the shape of the completed cell and is provided with a flat lower face 5 to rest upon the upper surface of the separator 2. A bulge or extension 6 is formed on the upper side of the mix cake during assembly of the cell elements.

The cathode forming the subject matter of the present invention is shown in detail in side elevation and plan view in Fig. 3 of the drawings and consists of a sheet 7 of flexible material. I preferably employ a sheet of light weight cotton fabric, although other types of fabric including metal wire screen may be employed. This fabric is coated or impregnated with a conductive paint which forms the cathode of the cell. The coating used is preferably one that is impervious to the electrolyte to prevent a short circuit with the adjacent zinc anode of another cell. It preferably consists of a conductive pigment, such as graphite or acetylene black or a mixture of the two mixed with an elastomer. It is applied to the fabric by dispersing it in a suitable solvent to a viscosity that can be readily spread and which will readily penetrate throughout the interstices of the fabric. As an elastomer I may use vinyl chloride-acetate copolymer. Other materials which are suitable are polyvinyl butyral compositions, either of the thermoplastic or thermosetting variety, and copolymers of vinylidene chloride with vinyl chloride. Any suitable solvent may be used and I preferably employ a mixture of methyl ketone and toluene.

The conductive material may be applied to the fabric base in any suitable manner. One method which has been successfully employed is by means of a knife coating machine applying a number of successive coats. The conductive composition is uniformly applied to the fabric and the fabric is then passed through a drying chamber to evaporate the solvent. The first coatings are forced through the fabric to coat and to partially impregnate the individual fibers.

In forming a cell in the manner disclosed in the drawings, the cell elements are assembled with the edges of the separator bent upwardly to form the flange 3 and the group of cell elements are then surrounded by an elastic ring 8 which is of such size that its upper and lower edges extend over portions of the top and bottom of the cell as shown in Fig. 2. If the cell is to be used individually, suitable leads 10 may be connected to the two electrodes of the cell in any suitable manner as indicated at 10 in Fig. 2. The advantages of the flexible cathode will be apparent from Fig. 2 of the drawings. If a flat cathode plate were employed, it will be apparent that the outer face of the cathode would be below the outer face of the elastic covering 9 a distance equal to the thickness of this covering similarly to the outer face of the anode. By employing a flexible cathode which may be readily shaped to extend over the projecting portion 6 of the mix cake, intimate contact between the cathode and the anode of an adjacent cell is readily obtained.

Likewise the cathode lends itself to use with batteries formed of a plurality of cells or groups of cell elements mounted in rigid trays as described in the said copending application above referred to. In such constructions a considerable portion of the bottom of each tray is open to permit exposure of the anode of the cell and by employing a mix cake having a projecting portion and a cathode extending over this projecting portion, the cathode of one cell and the anode of the adjacent cell can be brought into intimate contact and permanently secured to each other by means of a suitable conductive cement.

Such construction is illustrated in Figs. 4 to 6 of the drawings, wherein the reference numeral 31 designates generally a tray of the type disclosed in copending application Serial No. 654,904, filed March 16, 1946, now U. S. Patent No. 2,521,880, which may be of any desired shape but which as shown is substantially rectangular in horizontal cross section with rounded corners 32. This tray may be made of any dielectric material, but is preferably of a thermoplastic material to permit sealing of a plurality of the trays to each other to form a battery. The tray is substantially in the form of a shallow cup having straight side walls 33 and having an opening 34 of substantial size in the bottom of the tray. A flange 35 depends from the bottom of the tray and is spaced inwardly of the edge a distance equal to the thickness of the side wall so that each flange will be snugly received within the side of the next adjacent tray as shown in Fig. 5. The upper portion of the flange is of greater thickness than the lower portion as indicated at 36 and the bottom of the tray may be provided with a recess 37.

The complete cell comprises an anode 38 which may be provided with a coating of conductive cement 39 as disclosed in application Serial No. 656,205, filed March 22, 1946, now U. S. Patent No. 2,526,789. Cathode 44, which forms the subject matter of the present invention, consists of a strip of cloth or other flexible material impregnated with a carbon paint 45 which forms the electrode and which is similar to the coating hereto described in connection with Figs. 1 to 3. A coating 46, similar to the coating 39, may be applied to the opposite surface of the cloth and this coating serves to secure the cathode of one cell to the anode of another cell when the cells are assembled. The electrodes are sealed to each other and to the upper and lower sides of the bottom of the tray by a heated punch. By employing the flexible cathode 44, the cathode may be offset or deformed by an embossed portion on the end of the punch, as shown in Fig. 5, to extend through the bottom of the adjacent tray and to be firmly sealed to the under surface of the anode of the adjacent cell by the conductive cement.

An absorbent sheet 40 of blotting paper or other fibrous material serving as a separator is arranged on top of the anode. The separator is preferably provided with a coating of paste on the side adjacent the anode and carries the usual electrolyte. A mix cake 41 is arranged on top of the separator, the mix cake consisting of a pressed cake of the usual depolarizing mix used in dry cells. It may thus consist of a mixture of powdered carbon and manganese dioxide with a suitable binder to retain the components in cake form. The mix cake is slightly smaller in area than the area of the tray and when a number of trays are assembled to form a battery, the inner side of the portion 36 of the flange engages the sides of the mix cake to properly position and center it as shown in Fig. 5. This provides an air space 42 in each cell. In Fig. 4 of the drawings the mix cake is shown having a central section 43 of increased height to extend through the opening 34 in the bottom of the adjacent tray. In practice the mix cake originally is of uniform height throughout but is shaped as shown in Fig. 4 after it is placed in the cell and compressed with the other cell elements.

In constructing a battery, the trays into which the cathodes and anodes have been mounted are filled with separators and mix cakes and the trays then stacked as shown in Fig. 5. The stack is placed under compression to bring the elements into intimate contact with each other and while under pressure, the assembly is dipped into a solvent for the material of the trays, removed, drained and allowed to dry. This operation cements the outer wall of the flange 35 of one tray to the inner wall 33 of the adjacent tray causing them to adhere to each other. By the pressure applied, the mix cake is also shaped to provide the projection 43 and cause it to extend into the embossed portion of the cathode.

When a number of cells are connected to form a battery, suitable leads 47 and 48 are connected to the bottom and top of the battery. The lead 47 is connected directly to the zinc plate in any suitable manner as by soldering, as indicated at 49. It is not advisable to directly expose the cloth cathode of the upper cell and I preferably place several metal plates 50 over it and retain these plates in position by suitable material 51, such as a fibrous material, pitch or the like. The lead 48 is soldered or otherwise connected to the outer one of these plates as indicated at 52. The upper assembly is held in place by the bottom and flange of a tray from which the side walls are removed.

I claim:

1. A dry cell comprising an anode, a separator carrying electrolyte salt in contact with the anode, a depolarizing mix in contact with the separator, and a flexible, impervious cathode in contact with the depolarizing mix, the cathode comprising a porous member impregnated with a carbon paint.

2. A dry cell comprising an anode, a separator carrying electrolyte salt in contact with the anode, a depolarizing mix in contact with the separator, and a cathode in contact with the depolarizing mix, the cathode comprising a sheet of fabric impregnated with a carbon paint.

3. A dry cell comprising an anode, a separator carrying electrolyte salt in contact with the anode, a depolarizing mix in contact with the separator, and a cathode in contact with the depolarizing mix, the cathode comprising a sheet of cloth impregnated with a carbon paint.

4. A dry cell comprising a substantially rigid tray having an opening in the bottom thereof, an anode arranged on the bottom of the tray, a separator and a mix cake arranged over the anode, a portion of the top of the mix cake being of greater height than the remainder to extend into the opening in the bottom of the tray of the next cell when a plurality of cells are assembled to form a battery, and a flexible cathode arranged on top of the mix cake, the cathode comprising a porous member impregnated with a carbon paint.

5. A dry cell comprising a substantially rigid tray having an opening in the bottom thereof, an anode arranged on the bottom of the tray, a separator and a mix cake arranged over the anode, a portion of the top of the mix cake being of greater height than the remainder to extend into the opening in the bottom of the tray of the next cell when a plurality of cells are assembled to form a battery, and a cathode arranged over the mix cake, the cathode comprising a sheet of previous, flexible material impregnated with carbon.

6. A dry cell comprising a substantially rigid tray having an opening in the bottom thereof, an anode arranged on the bottom of the tray, a separator and a mix cake arranged over the anode, a portion of the top of the mix cake being of greater height than the remainder to extend into the opening in the bottom of the tray of the next cell when a plurality of cells are assembled to form a battery, and a cathode arranged over the mix cake, the cathode comprising a sheet of fabric impregnated with carbon.

7. A dry cell comprising an anode, a separator carrying electrolyte salts in contact with the anode, a depolarizing mix in contact with the separator and a cathode in contact with the depolarizing mix, the cathode comprising a sheet of flexible material impregnated with a conductive pigment dispersed in an elastomer.

8. A flexible water impermeable carbon plate electrode comprising a coherent sheet of a fibrous liquid permeable material impregnated from face to face with an imperforate coherent layer of a solid water-impermeable, water-insoluble film-forming binder which is coextensive with the sheet and fills the interstices thereof, said binder having carbonaceous particles of a graphitic nature uniformly distributed therethrough.

JOHN M. MARTINEZ.

REFERENCES CITED

The following references are of record in the file of this patent:

UNITED STATES PATENTS

| Number | Name | Date |
|---|---|---|
| 711,481 | Daboll | Oct. 21, 1902 |
| 1,613,586 | Dam | Jan. 4, 1927 |
| 1,872,581 | Haroldson | Aug. 16, 1932 |
| 2,251,913 | Brennan | Aug. 12, 1941 |
| 2,416,576 | Franz et al. | Feb. 25, 1947 |
| 2,579,743 | Kurlandsky | Dec. 25, 1951 |

FOREIGN PATENTS

| Number | Country | Date |
|---|---|---|
| 363,135 | France | Apr. 25, 1906 |
| 365,754 | Great Britain | Jan. 28, 1932 |
| 558,207 | Great Britain | Dec. 24, 1943 |